(12) United States Patent
Tatsumi et al.

(10) Patent No.: US 11,699,296 B2
(45) Date of Patent: Jul. 11, 2023

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventors: Daisuke Tatsumi, Kanagawa (JP); Manabu Ueda, Kanagawa (JP); Akane Abe, Kanagawa (JP); Jun Ando, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 12 days.

(21) Appl. No.: 17/322,907

(22) Filed: May 18, 2021

(65) Prior Publication Data

US 2022/0180091 A1 Jun. 9, 2022

(30) Foreign Application Priority Data

Dec. 9, 2020 (JP) .................................. 2020-204533

(51) Int. Cl.
*G06V 30/40* (2022.01)
*G06V 30/10* (2022.01)

(52) U.S. Cl.
CPC .............. *G06V 30/40* (2022.01); *G06V 30/10* (2022.01)

(58) Field of Classification Search
CPC ........ G06V 30/40; G06V 30/10; G06V 10/25; G06V 30/412
See application file for complete search history.

(56) References Cited

U.S. PATENT DOCUMENTS

| 2004/0213444 | A1* | 10/2004 | Yamamichi | G06T 5/50 382/128 |
| 2004/0218838 | A1* | 11/2004 | Tojo | G06F 16/50 382/181 |
| 2005/0134935 | A1* | 6/2005 | Schmidtler | G06V 30/40 358/448 |
| 2018/0150956 | A1* | 5/2018 | Kao | G06V 10/82 |
| 2019/0294912 | A1* | 9/2019 | Takabayashi | G06K 9/6256 |
| 2021/0089804 | A1* | 3/2021 | Uejo | G06V 30/155 |

FOREIGN PATENT DOCUMENTS

| JP | 2004199529 | 7/2004 |
| JP | 4566510 | 10/2010 |
| JP | 2011-248609 | 12/2011 |

(Continued)

*Primary Examiner* — King Y Poon
*Assistant Examiner* — Michael L Burleson
(74) *Attorney, Agent, or Firm* — JCIPRNET (57) ABSTRACT

An information processing apparatus includes a processor configured to: acquire an image corresponding to a key character string from a target image in response to the key character string that serves as a character string specified beforehand as a key and is acquired from results of character recognition performed on the target image including character strings; extract, by using results of acquiring the image corresponding to the key character string, from the results of the character recognition a value character string that serves as a character string indicating a value corresponding to the key character string; and output the key character string and the value character string corresponding to the key character string.

20 Claims, 5 Drawing Sheets

(56) References Cited

FOREIGN PATENT DOCUMENTS

| | | |
|---|---|---|
| JP | 5621169 | 11/2014 |
| JP | 2015-052864 | 3/2015 |
| JP | 6109688 | 4/2017 |
| JP | 2018-073203 | 5/2018 |
| JP | 6616269 | 12/2019 |

* cited by examiner

DOCUMENT XX

CORPORATION XX
XX-KU, TOKYO

APPLICATION DATE    MONTH XX, DAY XX, YEAR XXXX

APPLICANT NAME      TARO FUJI

APPLICANT ADDRESS   XX CITY, KANAGAWA PREFECTURE

FIG. 4

| KEY NAME | POSITION INFORMATION |
|---|---|
| APPLICATION DATE | K-RIGHT-V |
| NAME | K-RIGHT-V |
| ADDRESS | K-RIGHT-V |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-204533 filed Dec. 9, 2020.

BACKGROUND

(i) Technical Field

The present disclosure relates to an information processing apparatus and a non-transitory computer readable medium.

(ii) Related Art

Japanese Patent No. 5621169 discloses a form recognition apparatus that reads a read-target character string from a form group including a variety of layouts and determines an attribute of the character string without any definition of a form. The form recognition apparatus includes a character string detection unit, character string recognition unit, item-name likelihood calculation unit, item value likelihood calculation unit, placement likelihood calculation unit, item-name to item-value relation evaluation value calculation unit, and item-name to item-value relation determination unit. The character string detection unit detects a character string region from a form image. The character string recognition unit recognizes individual characters in the character string region. The item name likelihood calculation unit calculates an item name likelihood representing a probability of a character string being an item name in the form image. The item value likelihood calculation unit calculates an item value likelihood representing a probability of a character string in the form image matching grammatical and notation rules of a word or a character string registered in a representation dictionary. The placement likelihood calculation unit calculates a placement likelihood. The placement likelihood indicates whether a placement of a pair of character strings in the form image is appropriate in an item-name to item-value relationship in terms of a character string frame of the character string pair or a character string rectangle. The item-name to item-value relation evaluation value calculation unit calculates an evaluation value that represents a likelihood of the character string pair as an item name to item value in accordance with the item name likelihood, item value likelihood, and placement likelihood. The item-name to item-value relation determination unit determines association of an item-name to item-value relation in the form image in response to the evaluation value output by the item-name to item value-relation evaluation value calculation unit.

Japanese Patent No. 6616269 discloses a technique that causes a computer of a form processing apparatus to function as elements described below. The elements include an image reading unit, character string recognition unit, same-row character string group information acquisition unit, specific character string determination unit, specific image determination unit, and content item acquisition unit. The image reading unit acquires a form image by causing an image reading apparatus to reach the form. The character string recognition unit recognizes a character string by performing a character recognition operation on the form image acquired by the image reading unit. The same-row character string group information acquisition unit acquires same-row character string group information about a character string group at the same row from among character strings recognized by the character string recognition unit. The specific character string determination unit determines whether a predetermined character string is included in each piece of the same-row character sting group information acquired by the same-row character string group information acquisition unit. The specific image determination unit determines whether a predetermined specific image is present in the vicinity of the same-row character string group information that is determined as including the specific character string by the specific character string determination unit. If the specific image determination unit has determined that the specific image is present, the content item acquisition unit acquires as a specific content item described in the form an item character string included in the same-row character string group information in the vicinity of the specific image.

Techniques of extracting a character string included in an image by performing an optical character recognition (OCR) operation (or simply character recognition operation) on the mage read from a document are available. To extract a character string from an image through the OCR operation, key value extraction may be performed to extract a character string having a value (hereinafter referred to as a value character string) corresponding to a character string specified beforehand as a key (hereinafter referred to as a key character string).

In the key value extraction via the OCR operation, the value character string may be not successfully extracted from results of the OCR operation because of erratic recognition in results of the OCR operation or even when the key character string is extracted, a degree of certainty of the extracted key character string may be lower than a predetermined criteria. In such a case, the value character string corresponding to the key character string is difficult to extract.

SUMMARY

Aspects of non-limiting embodiments of the present disclosure relate to providing an information processing apparatus and a non-transitory computer readable medium extracting a key character string corresponding to a value character string even when the key character string is difficult to extract in the key value extraction via the character recognition operation or the degree of certainty of the key character string is lower.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: acquire an image corresponding to a key character string from a target image in response to the key character string that serves as a character string specified beforehand as a key and is acquired from results of character recognition performed on the target image including character strings; extract, by using results of acquiring the image corresponding to the key character string, from the results of the character recognition a value character string that serves as a character string indicating a value corresponding to the key character string; and output the key character string and the value character string corresponding to the key character string.

BRIEF DESCRIPTION OF THE DRAWINGS

Exemplary embodiment of the present disclosure will be described in detail based on the following figures, wherein.

DETAILED DESCRIPTION

Exemplary embodiment of the disclosure is described in detail with reference to the drawings.

Figure 1:
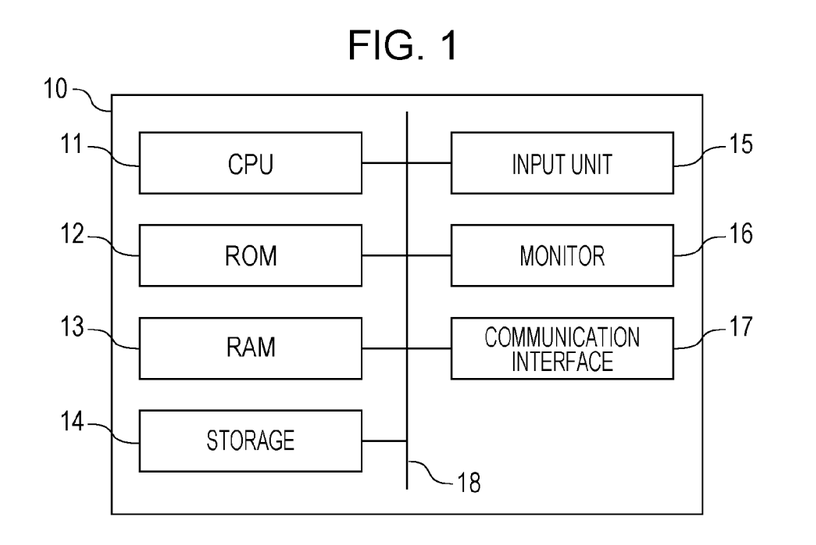
FIG. 1 is a block diagram illustrating a hardware configuration example of an information processing apparatus of an exemplary embodiment.

A configuration of an information processing apparatus 10 is described with reference to FIG. 1. FIG. 1 is a block diagram illustrating a hardware configuration example of the information processing apparatus 10 of the exemplary embodiment. For example, the information processing apparatus 10 of the exemplary embodiment includes but is not limited to a terminal, such as a personal computer, or a server. The information processing apparatus 10 may be built in another apparatus, such as an image forming apparatus.

Referring to FIG. 1, the configuration of the information processing apparatus 10 includes a central processing unit (CPU) 11, read-only memory (ROM) 12, random-access memory (RAM) 13, storage 14, input unit 15, monitor 16, and communication interface (I/F) 17. The CPU 11, ROM 12, RAM 13, storage 14, input unit 15, monitor 16, and communication I/F 17 are interconnected to each other via a bus 18. The CPU 11 is an example of processor.

The CPU 11 controls the whole of the information processing apparatus 10. The ROM 12 stores a variety of programs, including an extraction processing program, and data used in the exemplary embodiment. The RAM 13 is a memory used as a work area when the variety of programs are executed. The CPU 11 extracts a character string by expanding the program from the ROM 12 onto the RAM 13 and executing the program. For example, the storage 14 is a hard disk drive (HDD), solid-state drive (SSD), or flash memory. The extraction processing program may also be stored on the storage 14. The input unit 15 includes a mouse and keyboard receiving input characters. For example, the monitor 16 displays an extracted character. The communication I/F 17 transmits or receives data.

Figure 2:
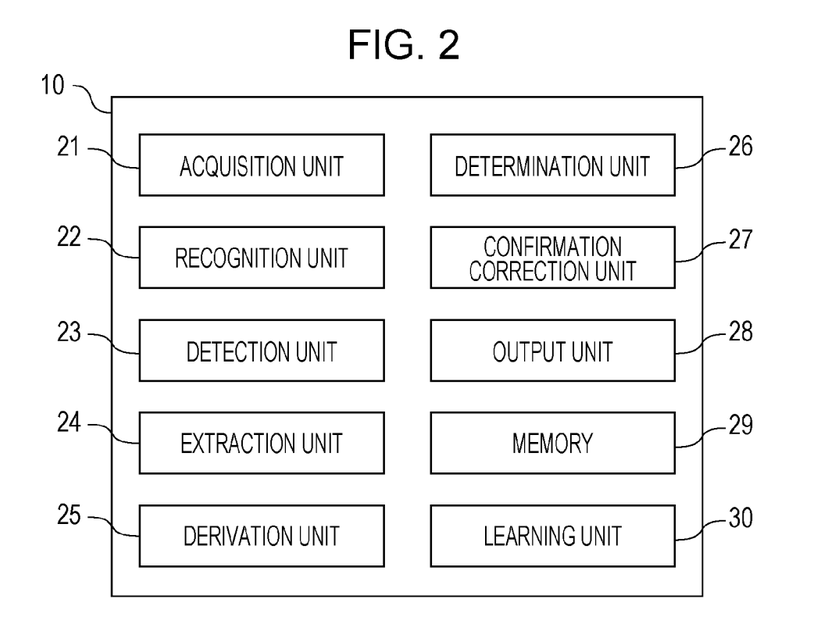
FIG. 2 is a block diagram illustrating a functional configuration example of the information processing apparatus of the exemplary embodiment.

Referring to FIG. 2, the functional configuration of the information processing apparatus 10 is described. FIG. 2 is a block diagram illustrating a functional configuration example of the information processing apparatus 10 of the exemplary embodiment.

Referring to FIG. 2, the information processing apparatus 10 includes an acquisition unit 21, recognition unit 22, detection unit 23, extraction unit 24, derivation unit 25, determination unit 26, confirmation correction unit 27, output unit 28, memory 29, and learning unit 30. When the CPU 11 executes the extraction processing program, the information processing apparatus 10 functions as the acquisition unit 21, recognition unit 22, detection unit 23, extraction unit 24, derivation unit 25, determination unit 26, confirmation correction unit 27, output unit 28, memory 29, and learning unit 30.

Figure 3:
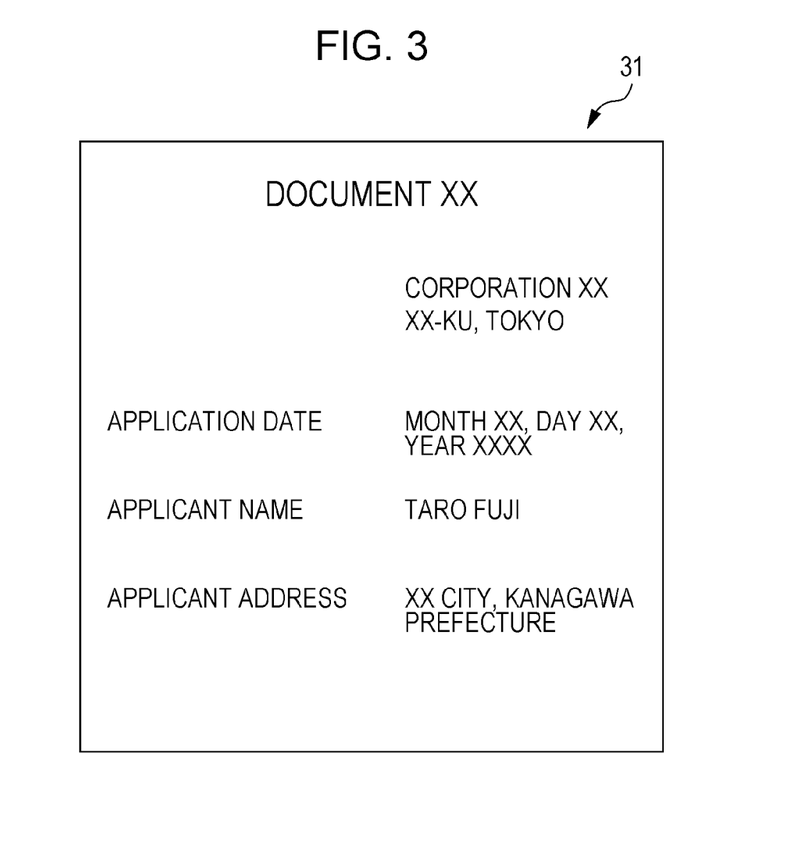
FIG. 3 illustrates an example of a target image from which a character string is extracted in accordance with the exemplary embodiment.

The acquisition unit 21 acquires an image 31 serving as a target (hereinafter referred to as a target image 31) from which a character string is extracted. Referring to FIG. 3, the target image 31 of the exemplary embodiment is the image of a document that includes but is not limited to an entry item and a character string described by a user for the entry item. The target image 31 is not limited to the image of such a document. The target image 31 may be an image of a form or a slip delineated by ruled lines, a mechanically printed receipt, or any other image of a document as long as it includes a character string.

Via the optical character recognition (OCR) operation, the recognition unit 22 acquires from the target image 31 a character string and positions (coordinates) of the character string included in the document and outputs these pieces of data as recognition results.

Via an object detection process, the detection unit 23 detects a position of a region of an image corresponding to a character string specified in the target image 31. Specifically, the detection unit 23 is a learning model, such as convolution neural network (CNN) and you only look once (YOLO), which has performed machine learning to detect a specified character string. The detection unit 23 detects from the target image 31 the region of the image corresponding to the character string specified in the target image 31. The detection unit 23 thus acquires the specified character string and the position (coordinates) of the region of the image corresponding to the character string specified in the target image 31 and outputs these pieces of data as detection results.

The detection unit 23 of the exemplary embodiment is a learning model using machine learning and detects from the target image 31 the region of the image corresponding to the key character string specified in the target image 31. The disclosure is not limited to this method. The position of the region of the image corresponding to the key character string specified in the target image 31 may be detected via a pattern matching operation. For example, each image corresponding to a specified character string may be pre-stored. The region of the image corresponding to the key character string specified in the target image 31 may be detected by using the image corresponding to the specified character string in accordance with the pattern matching operation, such as shape detection or template matching.

The extraction unit 24 extracts a character string from the target image 31 by using results of character recognition performed by the recognition unit 22 or results of a detection operation performed by the detection unit 23. According to the exemplary embodiment, the character string is extracted from the target image 31 via key and value extraction. The key and value extraction is an operation to extract a combination of a key and a value. The key is a predetermined character string that serves as a reference and the value serves as a character string corresponding to the key.

The extraction unit 24 searches the results of the character recognition or the results of the detection operation for a character string serving as a specified key (hereinafter referred to as a "key character string") and acquires a position of the key character string. By using the acquired position, the extraction unit 24 extracts from the results of the character recognition a character string serving as a value corresponding to the key character string (hereinafter referred to as a "value character string"). Specifically, the extraction unit 24 extracts as the value character string a character string present in the vicinity of the key character string. The character string present in the vicinity of the key character string may be a character string within a predetermined distance from the position of the key character string or a character string at the shortest distance from the key character string. For example, if a "name" is specified as a character string in FIG. 3, the extraction unit 24 extracts "Fuji Taro" as the value character string.

Figure 4:
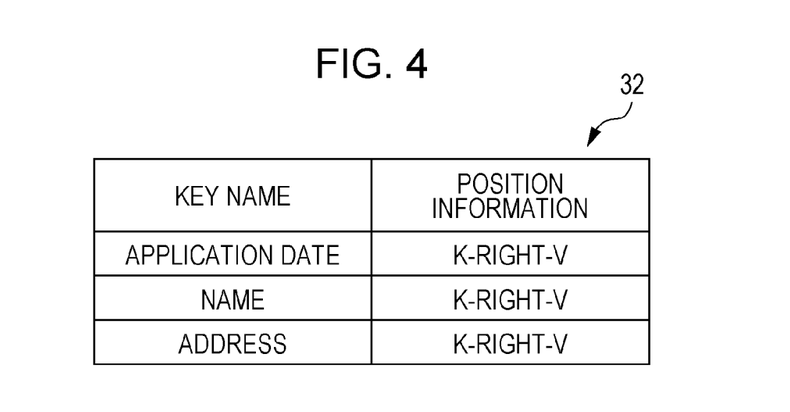
FIG. 4 illustrates an example of a position information database of the exemplary embodiment.

According to the exemplary embodiment, a character string in the vicinity of the key character string is extracted as the value character string. The disclosure is not limited to this method. For example, a character string present in a predetermined direction from the key character string as the reference may be extracted as the value character string. For example, the memory 29 may store a position information database (DB) 32 that associates a key name with position information as illustrated in FIG. 4. The key name is the name of a key character string described in the target image 31 of a document and the position information indicates a direction in which the value character string is present with respect each key character string as the reference. For example, position information "K-Right-V" of an "application date" in FIG. 4 indicates that a value character string "month xx, day xx, year xxxx" is positioned to the right of the key character string "application date" in the target image 31. Specifically, the extraction unit 24 extracts as the value character string a character string positioned in the direction indicated by the position information on the position information DB 32 with respect to the position of the key character string as the reference.

The derivation unit 25 derives a degree of certainty indicating how certain the key character string or the value character string extracted by the extraction unit 24 is. For example, by referencing similar character strings from among the key character strings and the value character strings pre-stored on the memory 29, the extraction unit 24 may derive the degrees of certainty of the key character string and the value character string extracted from the target image 31. For example, the derivation unit 25 calculates Levenshtein distances between the extracted key character string and value character string and the key character string and value character string stored on the memory 29. The derivation unit 25 derives the degree of certainty, based on the degree of similarity between the key character string and value character string having minimum Levenshtein distances and the extracted key character string and value character string. The Levenshtein distance is determined by counting the number of character replacements, character additions, and character deletions when any character string is changed into another character string.

The determination unit 26 determines whether a key character string has been extracted from the target image 31. Specifically, if the degree of certainty is lower than a predetermined threshold or the key character string has not been extracted, the determination unit 26 determines that the key character string has not been extracted from the target image 31.

The confirmation correction unit 27 displays the key character string and value character string extracted from the target image 31 and the position of the key character string in the target image 31 and receives a correction to the position of the key character string.

The output unit 28 outputs the key character string and value character string extracted from the target image 31.

The memory 29 stores the key character string and value character string extracted from the target image 31. The memory 29 also stores the target image 31 and the position of the key character string in the target image 31 in association with each other. The memory 29 also stores an image corresponding to the key character string, position information DB 32, key character string and value character string extracted in the past.

The learning unit 30 learns the positions of the key character string and value character string by using the target image 31 on the detection unit 23. Specifically, the learning unit 30 causes the detection unit 23 to learn with the target image 31 and key character string as input data and with the position of the key character string as teacher data.

Figure 5:
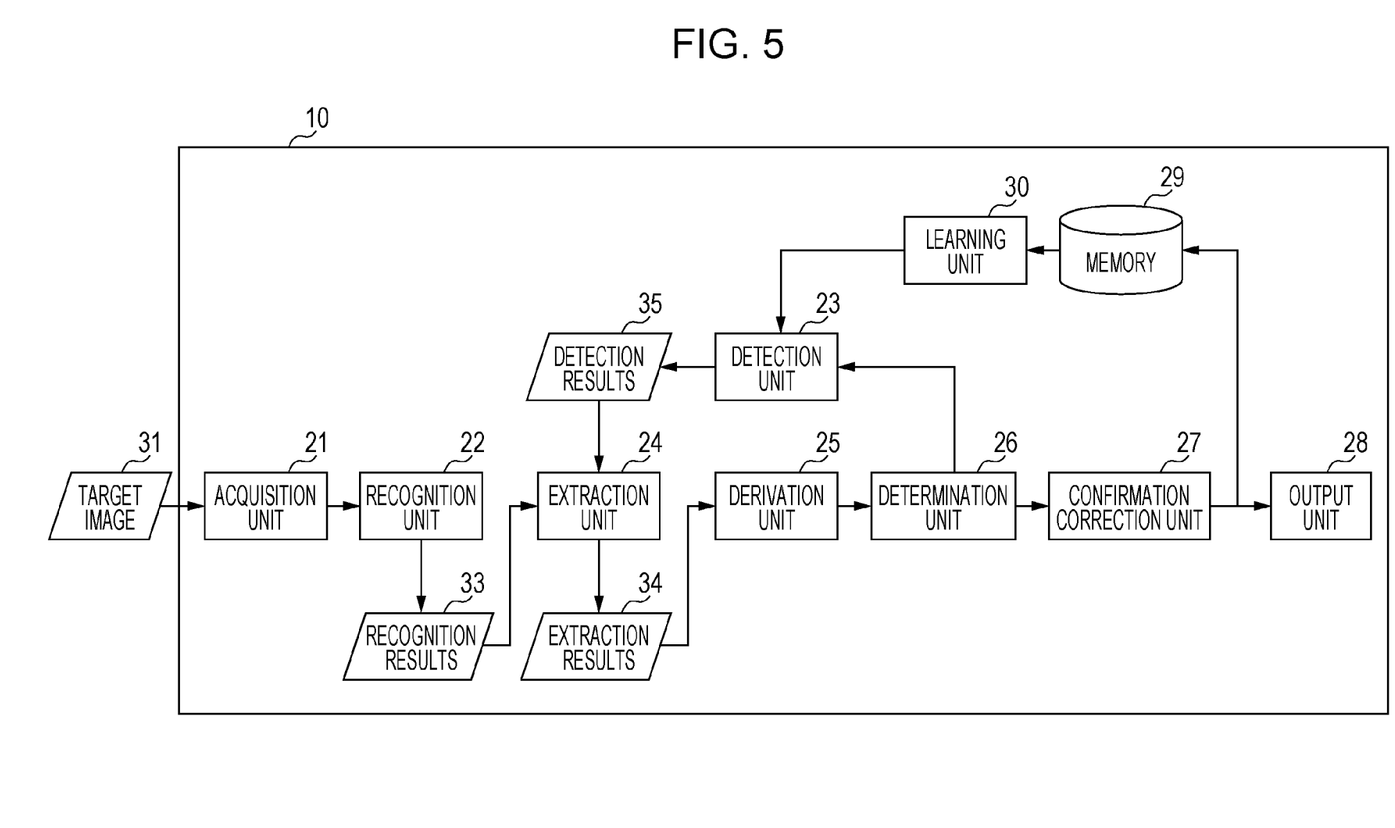
FIG. 5 illustrates a data flow chart illustrating an example of data flow in an extraction process of the exemplary embodiment.

The process of extracting the key character string and value character string in accordance with the exemplary embodiment is first described with reference to FIG. 5, followed by the process of the information processing apparatus 10. FIG. 5 illustrates a data flow chart illustrating an example of data flow in the extraction process of the exemplary embodiment to extract the key character string and value character string in accordance with the exemplary embodiment.

The acquisition unit 21 acquires the target image 31 and inputs the acquired target image 31 to the recognition unit 22.

The recognition unit 22 performs character recognition operation on the acquired target image 31 and output recognition results 33 of recognizing characters included in the target image 31. The recognition results 33 include the character string recognized from the target image 31 and the position (coordinates) of the character string in the target image 31. According to the exemplary embodiment, the recognition unit 22 recognizes the character string included in the target image 31. The recognition unit 22 may analyze the target image 31, identify the type of the document, and output the identified type as the recognition results 33. For example, in the analysis, in one method, a specific character string and a position of a ruled line are recognized and the recognition results are compared with pre-stored feature of documents to identify the type. In another method, an identifier identifying a document in the target image 31 may be recognized to identify the type of the document. By causing the type of the document to be identified, the key character string included in each document may be identified. Specifically, the recognition unit 22 may identify a character string to be extracted by identifying the type of the document.

The extraction unit 24 acquires the position of a predetermined key character string by searching for the predetermined key character string in the recognition results 33 output by the recognition unit 22. By using the position of the key character string, the extraction unit 24 identifies the value character string corresponding to the key character string, and then outputs as extraction results the key character string and value character string in association with each other.

The derivation unit 25 derives the degrees of certainty of the key character string and value character string by using the extraction results 34 output by the extraction unit 24.

By using the extraction results 34 output by the extraction unit 24 and the derived degree of certainty, the determination unit 26 determines whether the key character string has been extracted and whether the degree of certainty of the key character string is higher than the predetermined threshold. If the key character string has not been extracted or the degree of certainty of the key character string is equal to or lower than the predetermined threshold, the determination unit 26 determines that the key character string has not successfully extracted and outputs an instruction to cause the detection unit 23 to perform an extraction process to extract the key character string from the target image 31.

If the determination unit 26 determines that the key character string has not extracted, the detection unit 23 specifies the key character string that has not been extracted and detects a region of an image corresponding to the key character string from the target image 31 by using a learning model that has performed machine learning. If the region of the image corresponding to the key character string is detected, the detection unit 23 outputs as detection results 35 the specified key character string and the position of the region of the image corresponding to the key character string. If the region of the image corresponding to the key character string is not detected, the information processing apparatus 10 may extract the next key character string or may output an indication indicating that the key character string has not been extracted and an indication indicating that the region of the image corresponding to the key character string has not been detected.

The detection of the region of the image corresponding to the key character string in accordance with the exemplary embodiment means the detection of a region of an image where a character string corresponding to the key character string is described. For example, if the key character string is "address," the detection unit 23 detects from the target image 31 the region of the image where a character string, such as "domicile," or "residence," corresponding to the address, is described. The detection unit 23 of the exemplary embodiment detects the region of the image of the character string corresponding to the key character string. The disclosure is not limited to this method. For example, the region of the image of a character string bracketed, underlined, or enclosed may be detected. The region of the image of a character hatched, highlighted or outlined for enhancement may be detected. The detection unit 23 may learn an image of a character string corresponding to the key character string or an image of the character string bracketed, underlined, enclosed, hatched, highlighted, or outlined and then detects the region of the image corresponding to the key character string.

The extraction unit 24 identifies the value character string corresponding to the key character string by using the position of the key character string in the detection results 35 and outputs the key character string and the value character string in association with each other as the extraction results 34.

When the predetermined key character string is extracted, the confirmation correction unit 27 displays the target image 31, the key character string, and the position of the key character string and receives user correction to the position of the key character string.

Figure 6:
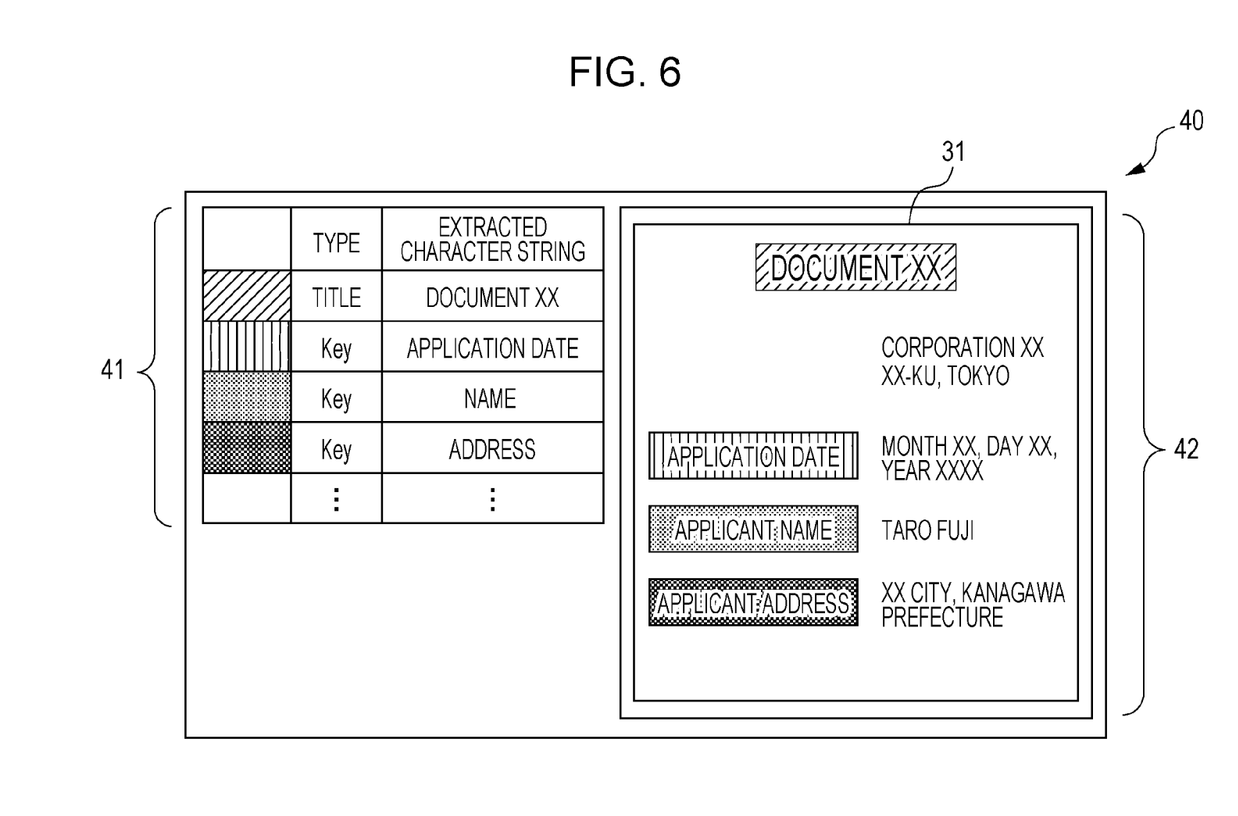
FIG. 6 illustrates an example of a confirmation correction screen that is used to correct or specify a character string in accordance with the exemplary embodiment.

Referring to FIG. 6, the confirmation correction unit 27 displays a confirmation correction screen 40. The confirmation correction screen 40 includes a specified character string display region 41 and a target image display region 42. The confirmation correction unit 27 displays the key character string and value character string extracted by the extraction unit 24 as extracted character strings on the specified character string display region 41. The confirmation correction unit 27 highlights the position of the key character string acquired from the recognition results 33 and the detection results 35 in the target image 31 on the target image display region 42.

When an extracted character string displayed on the specified character string display region 41 is selected and the position corresponding to the extracted character string on the target image display region 42 is specified, the confirmation correction screen 40 is ready to receive corrections to the key character string and the position of the key character string in the target image 31. For example, after the "application date" is selected in the specified character string display region 41, the region where the application data specified by the user is described is highlighted in the target image display region 42. This indicates that the key character string is associated with the position of the key character string. In this case, a color column corresponding to the "application date" in the specified character string display region 41 and the region of the application date in the target image display region 42 are high-lighted with the same color.

The confirmation correction unit 27 inputs to the memory 29 the target image 31, key character string, value character string, and position of the key character string in the target image 31 and inputs the key character string and value character string to the output unit 28.

The output unit 28 outputs the key character string and value character string input from the confirmation correction unit 27.

The memory 29 stores data, input by the confirmation correction unit 27 and including the target image 31, key character string, value character string input by the confirmation correction unit 27, and the position of the key character string specified in the target image 31 by the user.

By using the target image 31 stored on the memory 29, the learning unit 30 causes the detection unit 23 to learn the key character string and the position of the key character string in the target image 31. Specifically, the learning unit 30 causes the detection unit 23 to learn a target image 31 from which the extraction unit 24 has not successfully extracted the key character string or a target image 31 from which the extraction unit 24 has extracted the key character string having the degree of certainty lower than the predetermined threshold. In other words, the learning unit 30 causes the detection unit 23 to learn the target image 31 on which the detection unit 23 has performed a detection operation, the key character string related to the target image 31, and the position of the key character string related to the target image 31. In this way, the learning unit 30 may cause the detection unit 23 to learn the target image 31 that results in a lower accuracy in the character recognition. The detection unit 23 may perform learning each time the target image 31 to be learnt is acquired, when the number of target images 31 exceeds a predetermined number, or when a predetermined time comes.

Figure 7:
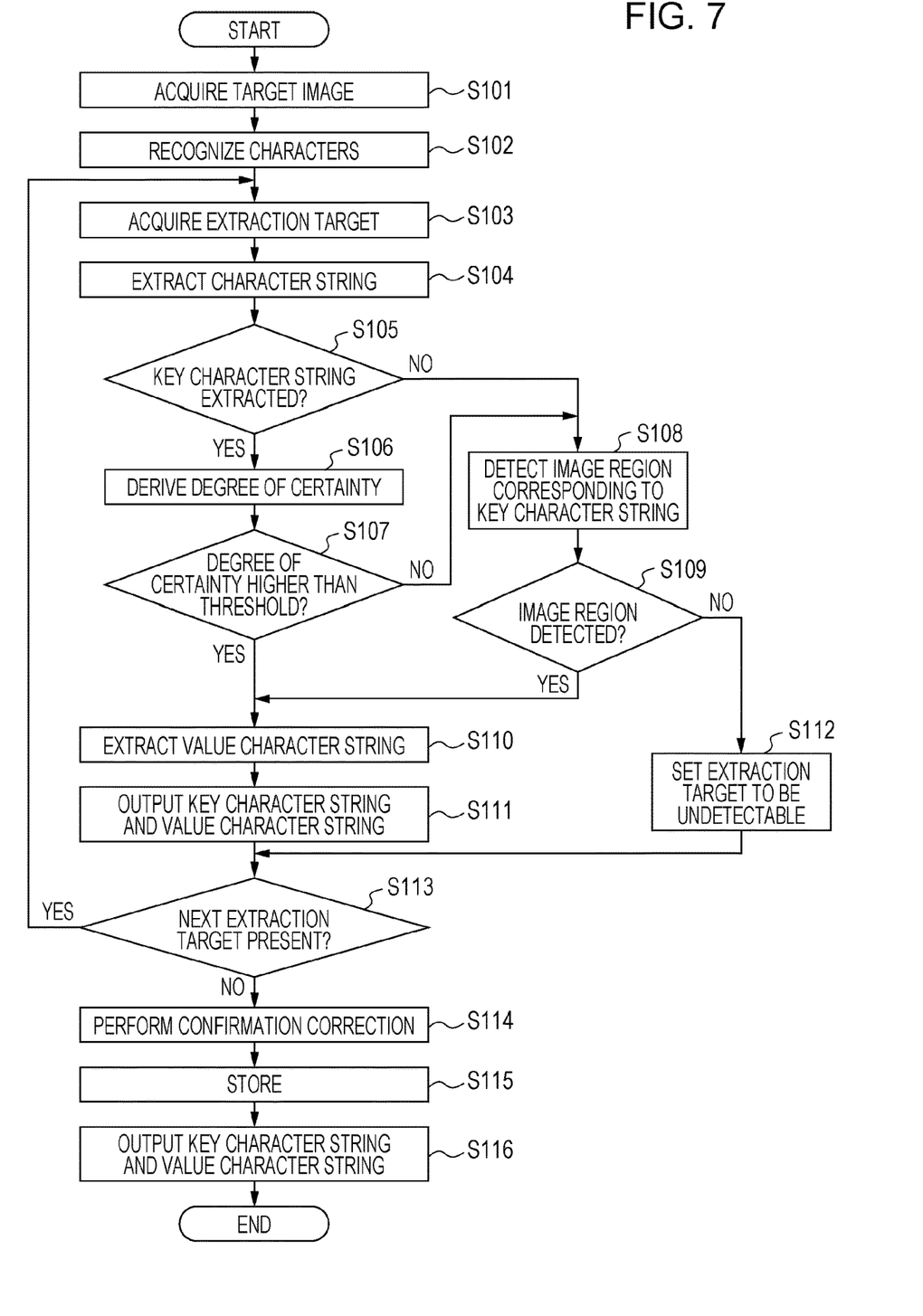
FIG. 7 is a flowchart illustrating an extraction process example to extract a character string in accordance with the exemplary embodiment.

The process of the information processing apparatus 10 of the exemplary embodiment is described with reference to FIG. 7. FIG. 7 is a flowchart illustrating an extraction process example to extract a character string in accordance with the exemplary embodiment. The CPU 11 reads the extraction processing program from the ROM 12 or the storage 14 and executes the extraction processing program.

The extraction processing program in FIG. 7 is thus executed. The extraction processing program in FIG. 7 is executed when the user inputs the target image 31 and an instruction to perform the extraction process.

In step S101, the CPU 11 acquires the target image 31 input by the user.

In step S102, the CPU 11 performs the character recognition operation on the acquired target image 31 and outputs a character string and a position of the character string as the recognition results 33.

In step S103, the CPU 11 acquires the key character string specified as an extraction target.

In step S104, the CPU 11 searches for and extracts the specified key character string from the recognition results 33 and outputs the extracted key character string and the position of the key character string as the extraction results 34.

In step S105, the CPU 11 determines in response to the extraction results 34 whether the specified key character string is extracted. If the key character string is extracted (yes path in step S105), the CPU 11 proceeds to step S106. If no key character string is extracted (no path in step S105), the CPU 11 proceeds to step S108.

In step S106, the CPU 11 derives the degree of certainty of the extracted key character string by using the extraction results 34.

In step S107, the CPU 11 determines whether the derived degree of certainty is higher than the predetermined threshold. If the derived degree of certainty is higher than the predetermined threshold (yes path in step S107), the CPU 11 proceeds to step S110. On the other hand, if the derived degree of certainty is equal to or lower than the predetermined threshold (no path in step S107), the CPU 11 proceeds to step S108.

In step S108, the CPU 11 performs a detection operation on the target image 31 to detect the region of the image corresponding to the specified key character string and outputs the key character string and position of the key character string as the detection results 35.

In step S109, the CPU 11 determines whether the region of the image corresponding to the key character string has been detected. If the region of the image corresponding to the key character string has been detected (yes path in step S109), the CPU 11 proceeds to step S110. If the region of the image corresponding to the key character string has been not detected (no path in step S109), the CPU 11 proceeds to step S112.

In step S110, the CPU 11 extracts the value character string corresponding to the key character string from the recognition results 33 by using the position of the key character string related to the recognition results 33 or the detection results 35.

In step S111, the CPU 11 outputs the key character string and value character string in association with each other into the extraction results 34.

In step S112, the CPU 11 sets the specified key character string as the extraction target to be undetectable.

In step S113, the CPU 11 determines whether a key character string as the next extraction target is present. If the next extraction target is present (yes path in step S113), the CPU 11 returns to step S103. If no next extraction target is present (no path in step S113), the CPU 11 proceeds to step S114.

In step S114, the CPU 11 displays the confirmation correction screen and receives user correction to the position of the key character string. If the specified key character string is set to be undetectable, the CPU 11 displays on the confirmation correction screen a notification indicating that the specified key character string has not been extracted from the target image 31 and a notification indicating that the region of the image corresponding to the key character string has not been detected.

In step S115, the CPU 11 stores the target image 31, key character string, value character string, and position of the key character string in association with each other. If the stored target image 31 is a target image 31 that has undergone the detection operation, learning is performed on the target image 31, key character string, and position of the specified key character string stored in association with each other.

In step S116, the CPU 11 outputs the key character string and value character string by using the extraction results 34.

If the key character string is not extracted via the character recognition or the extracted key character string has the degree of certainty equal to or lower than the predetermined threshold, the specified key character string is detected via the detection operation. The key character string is thus detected and the value character string corresponding to the key character string is extracted even when the key character string is not extracted via the character recognition or the extracted key character string has the degree of certainty equal to or lower than the predetermined threshold.

According to the exemplary embodiment, a character string included in a document is extracted and output as a key character string. The disclosure is not limited to this method. An attribute of a character string included in the document may be extracted as a key character string. For example, "application date" may be extracted from the document illustrated in FIG. 3. In this case, attribute "month, day, year" of the "application date" may be extracted as a key character string and may be associated with value character string "month xx, day xx, year xxxx." The attribute "month, day, year," key character string "application date," and value character string "month xx, day xx, year xxxx" may be associated with each other and then output.

According to the exemplary embodiment, the key character string is identified based on the type of the document. The disclosure is not limited to this method. The key character string may be received from the user. According to the exemplary embodiment, the key character string included in the document is specified and extracted. The disclosure is not limited to this method. The attribute may be specified. For example, the user may specify the attribute, and the key character string and value character string belonging to the specified attribute may be extracted.

According to the exemplary embodiment, the detection operation is performed if the specified key character string has not been extracted. The disclosure is not limited to this method. The key character string may be extracted via the extraction process if the key character string has not been detected via the detection operation. The key character string may be detected via the detection operation based on pattern matching if the key character string has not been detected via the detection operation based on a learning model.

According to the exemplary embodiment, the key character string is detected via the detection operation. The disclosure is not limited to this method. The value character string may be detected.

According to the exemplary embodiment, a correction to the position of the key character string is received on the confirmation correction screen 40. The disclosure is not limited to this method. A correction to the extracted key character string and value character string may be received. If the correction to the extracted key character string and value character string is to be received, the correction may be received with the extracted key character string and value character string uniformly displayed. If the degree of certainty of the key character string or the value character string is lower than the predetermined threshold, the key character string or value character string, the key character string or the value character string having the degree of certainty lower the predetermined threshold may be displayed.

According to the exemplary embodiment, a correction to the position of the key character string acquired from the recognition results 33 and the detection results 35 is received on the confirmation correction screen 40. The disclosure is not limited to this method. The designate of the position of the key character string in the target image 31 may be received.

According to the exemplary embodiment, the correction to the position of the key character string is received in the confirmation correction. The disclosure is not limited to this method. In one method, the designate of the position of the key character string may be received when the target image 31 is input to the information processing apparatus 10. In another method, at any time after the outputting of the key character string and value character string, the correction to the position of the key character string may be received with the target image 31 on the memory 29 displayed.

According to the exemplary embodiment, a correction to the key character string and value character string is received on the confirmation correction screen 40. The disclosure is not limited to this method. The extracted value character string may be corrected by using the value character string stored on the memory 29. The memory 29 may store multiple value character strings in association with each other and a value character corresponding to an extracted value character may be searched for on the memory 29. For example, the memory 29 may pre-store a value character string "name" and a value character string "address" in association with each other. If the value character string "name" is extracted, the value character "address" corresponding to the value character string "name" is acquired from the memory 29 and used as a substitute candidate for correction.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

According to the exemplary embodiments, the extraction processing program is installed on the storage 14. The disclosure is not limited to this method. The extraction processing program of the exemplary embodiments may be distributed in a recorded form on a computer readable recording medium, such as an optical disc, like a compact-disc read-only memory (CD-ROM) or digital versatile disc ROM (DVD-ROM). Alternatively, the extraction processing program may be distributed in a recorded form on a semiconductor memory, such as a universal serial bus (USB) memory or a memory card. The extraction processing program of the exemplary embodiments may be acquired from an external apparatus via a communication network, such as the communication I/F 17.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
acquire a target image;
perform character recognition on the target image and output results of character recognition;
extract character strings from the results of character recognition;
determine whether a key character string that serves as a character string specified beforehand as a key is included in the extracted character strings;
in response to the specified key character string not being included in the extracted character strings, acquire an image region corresponding to the specified key character string from the target image, wherein the image region is located at a predetermined direction within a predetermined distance from the specified key character string;
extract, from the image region, a value character string that serves as a character string indicating a value corresponding to the specified key character string; and
output the specified key character string and the extracted value character string corresponding to the specified key character string.

2. The information processing apparatus according to claim 1, wherein the processor comprises a learning model that has learned to acquire an image region of a character string from an image, and
wherein the processor is configured to, by using the learning model, acquire the image region corresponding to the specified key character string from the target image.

3. The information processing apparatus according to claim 2, wherein the processor is configured to cause the learning model to learn by using the target image from which the image region corresponding to the specified key character string has been acquired.

4. The information processing apparatus according to claim 3, wherein the results of acquiring the image region corresponding to the specified key character string comprise information indicating a position of the specified key character string in the target image, and
wherein the processor is configured to extract the value character string by using the position of the specified key character string.

5. The information processing apparatus according to claim 4, wherein the processor is configured to:
acquire position information indicating a position of the value character string with respect to the specified key character string serving as a reference; and extract, by using the position of the specified key character string, the value character string at the position in the target image indicated by the position information.

6. The information processing apparatus according to claim 4, wherein the processor is configured to:
derive a degree of certainty of the extracted value character string; and
output the extracted value character string in accordance with the degree of certainty.

7. The information processing apparatus according to claim 3, wherein the processor is configured to:
derive a degree of certainty of the extracted value character string; and
output the extracted value character string in accordance with the degree of certainty.

8. The information processing apparatus according to claim 2, wherein the results of acquiring the image region corresponding to the specified key character string comprise information indicating a position of the specified key character string in the target image, and
wherein the processor is configured to extract the value character string by using the position of the specified key character string.

9. The information processing apparatus according to claim 5, wherein the processor is configured to:
acquire position information indicating a position of the value character string with respect to the specified key character string serving as a reference; and
extract, by using the position of the specified key character string, the value character string at the position in the target image indicated by the position information.

10. The information processing apparatus according to claim 9, wherein the processor is configured to:
derive a degree of certainty of the extracted value character string; and
output the extracted value character string in accordance with the degree of certainty.

11. The information processing apparatus according to claim 8, wherein the processor is configured to:
derive a degree of certainty of the extracted value character string; and
output the extracted value character string in accordance with the degree of certainty.

12. The information processing apparatus according to claim 2, wherein the processor is configured to:
derive a degree of certainty of the extracted value character string; and
output the extracted value character string in accordance with the degree of certainty.

13. The information processing apparatus according to claim 1, wherein the results of acquiring the image region corresponding to the specified key character string comprise information indicating a position of the specified key character string in the target image, and
wherein the processor is configured to extract the value character string by using the position of the specified key character string.

14. The information processing apparatus according to claim 4, wherein the processor is configured to:
acquire position information indicating a position of the extracted value character string with respect to the specified key character string serving as a reference; and
extract, by using the position of the specified key character string, the value character string at the position in the target image indicated by the position information.

15. The information processing apparatus according to claim 14, wherein the processor is configured to:
derive a degree of certainty of the extracted value character string; and
output the extracted value character string in accordance with the degree of certainty.

16. The information processing apparatus according to claim 13, wherein the processor is configured to:
derive a degree of certainty of the extracted value character string; and
output the extracted value character string in accordance with the degree of certainty.

17. The information processing apparatus according to claim 1, wherein the processor is configured to:
derive a degree of certainty of the extracted value character string; and
output the extracted value character string in accordance with the degree of certainty.

18. The information processing apparatus according to claim 17, wherein the processor is configured to derive the degree of certainty by using the value character string stored beforehand.

19. The information processing apparatus according to claim 1, wherein the processor acquires the image region by performing pattern matching on the target image and an image of the specified key character string.

20. A non-transitory computer readable medium storing a program causing a computer to execute a process for processing information, the process comprising:
acquiring a target image;
performing character recognition on the target image and output results of character recognition;
extracting character strings from the results of character recognition;
determining whether a key character string that serves as a character string specified beforehand as a key is included in the extracted character strings;
in response to the specified key character string not being included in the extracted character strings, acquiring an image region corresponding to the specified key character string from the target image, wherein the image region is located at a predetermined direction within a predetermined distance from the specified key character string;
extracting, from the image region, a value character string that serves as a character string indicating a value corresponding to the specified key character string; and
outputting the specified key character string and the extracted value character string corresponding to the specified key character string.

* * * * *